Jan. 20, 1953
H. A. INGALLS
2,625,729
METHOD OF CONSTRUCTING BUILDINGS
Filed Dec. 22, 1947
3 Sheets-Sheet 3
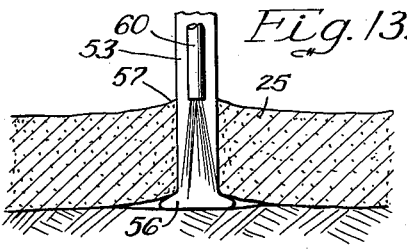
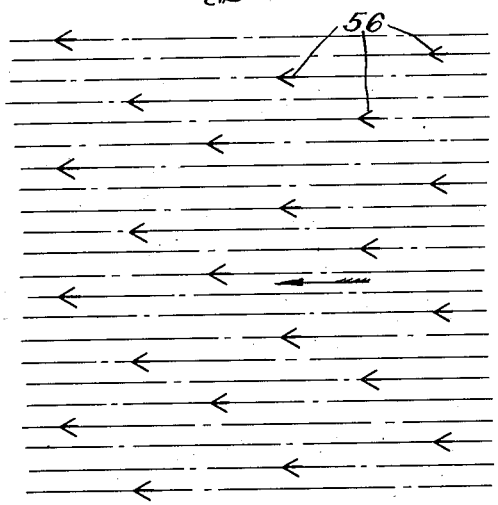
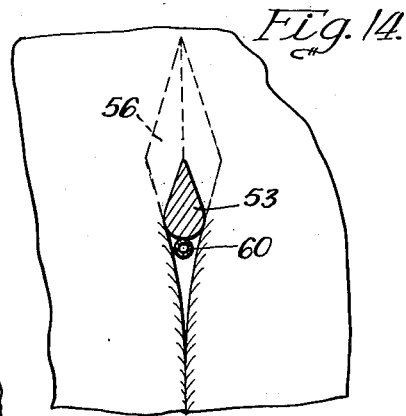
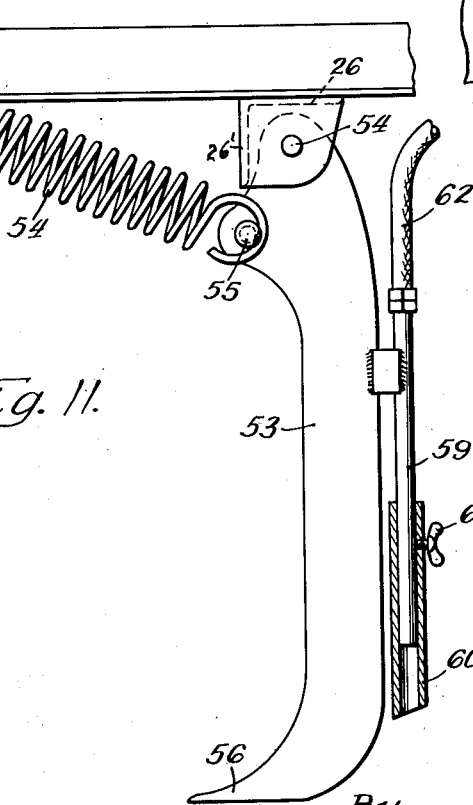
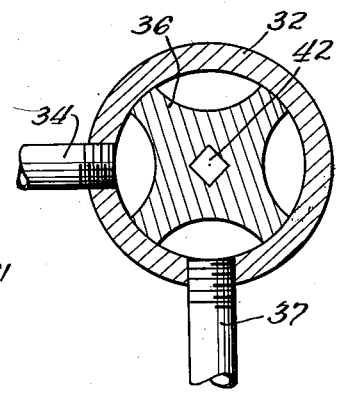
Inventor:
Henry A. Ingalls
By
Attys Patented Jan. 20, 1953

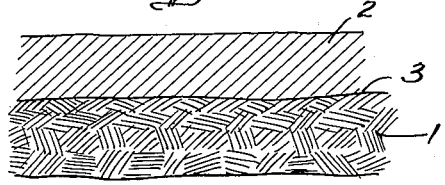
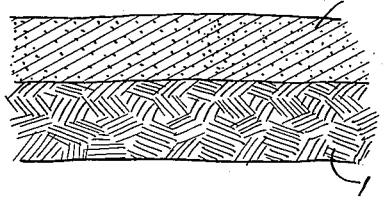
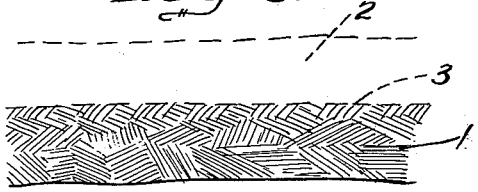
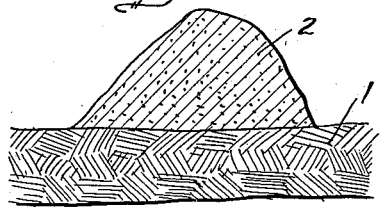
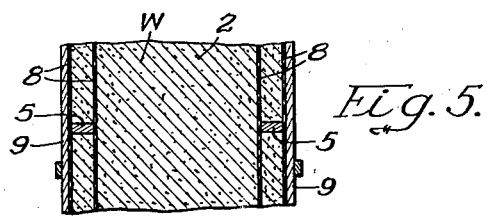
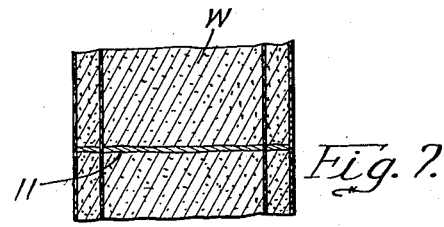
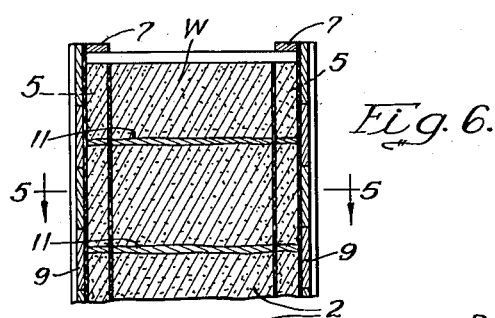
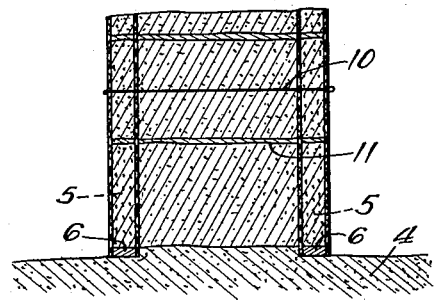
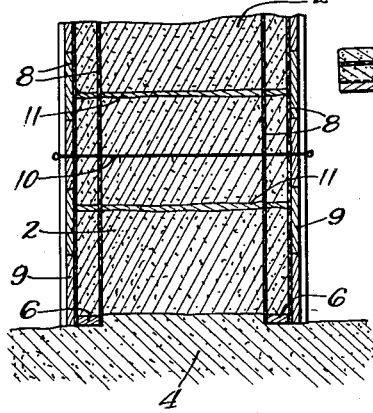
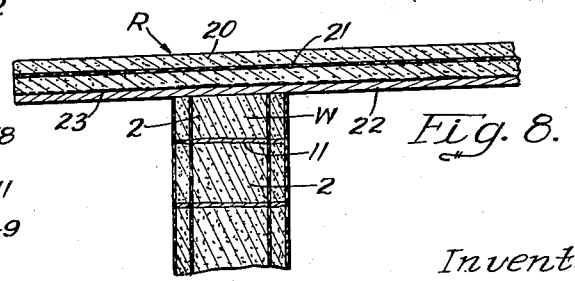
Inventor:
Henry A. Ingalls Jan. 20, 1953  H. A. INGALLS  2,625,729
METHOD OF CONSTRUCTING BUILDINGS
Filed Dec. 22, 1947  3 Sheets-Sheet 2
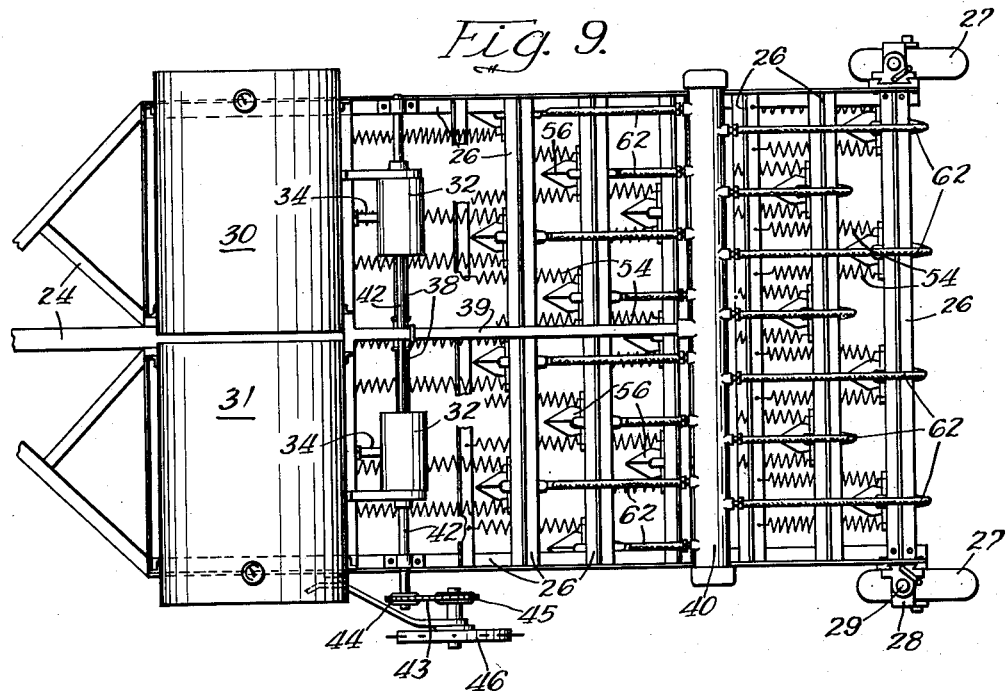
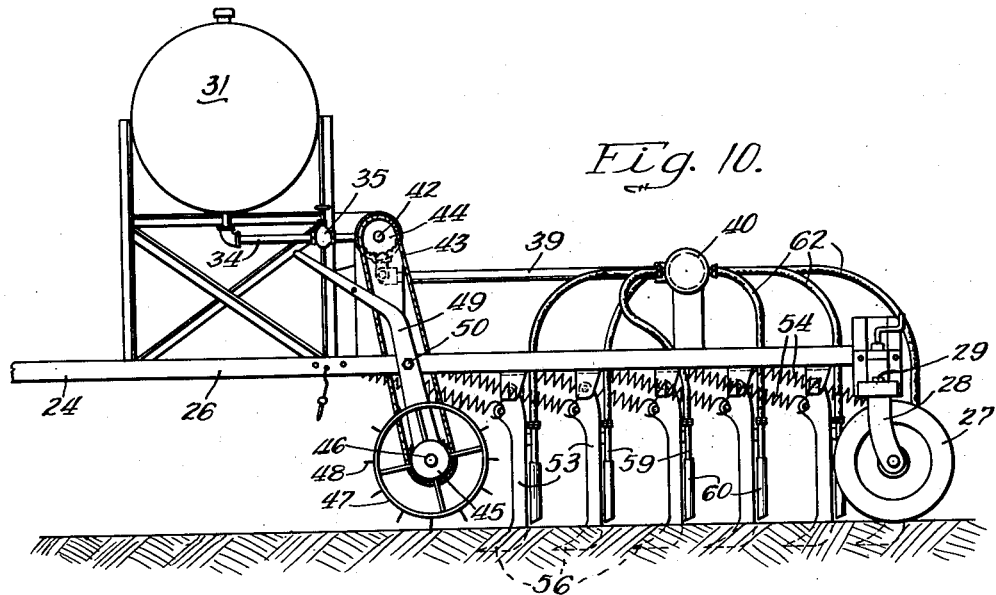
Inventor:
Henry A. Ingalls,
By
Attys.

2,625,729

UNITED STATES PATENT OFFICE 2,625,729

METHOD OF CONSTRUCTING BUILDINGS

Henry A. Ingalls, Bakersfield, Calif.

Application December 22, 1947, Serial No. 793,200

2 Claims. (Cl. 25—156)

My invention relates to a method of constructing a building.

I discovered that in the making of roads, soil at its situs may be readily treated and converted into a condition where it may be readily made into a smooth, strong, durable and inexpensive road surface, all of which is fully disclosed in my United States Letters Patent—Reissue No. 21,262, which was issued on November 14, 1939. I have since found that soil may be more or less similarly treated or stabilized and employed for making the walls, roof and floor of a building, which building when properly constructed, will withstand varying weather conditions, shocks and the like. A building constructed as herein described is termite-proof, fire, frost, sound and heat proof and may be built at a very low cost in little time with unskilled labor.

Many other objects and advantages of the construction herein shown and described will be obvious to those skilled in the art from the disclosure herein given.

To this end my invention consists in the novel method, herein shown and described and more particularly pointed out in the appended claims.

In the drawings, wherein like reference characters indicate like or corresponding parts:

Fig. 1 is a sectional view through ground, a portion of the soil of which is to be treated;

Fig. 2 is a similar view showing an upper layer which has been scarified and water and oil treated;

Fig. 3 is a view of the same illustrating that the top strata or layer of treated soil has been removed for stock piling;

Fig. 4 diagrammatically illustrates a stock pile of the removed material;

Fig. 5 is a horizontal section through a portion of a wall taken substantially on line 5—5 of Fig. 6;

Fig. 6 is a vertical sectional view taken substantially on line 6—6 of Fig. 5;

Fig. 7 is a view similar to Fig. 6 with the form boards removed;

Fig. 8 is a sectional view illustrating a wall and roof construction;

Fig. 9 is a plan view illustrating one embodiment of my apparatus for preparing the soil;

Fig. 10 is a side elevation of the same;

Fig. 11 is a side elevation illustrating one of the scarifiers and feed pipe;

Fig. 12 is a sectional view through one of the casings 32 and metering valve;

Fig. 13 is a view of one of the scarifiers and rear elevation of the same;

Fig. 14 is a sectional view through the same; and

Fig. 15 is a view diagrammatically illustrating the arrangement of the scarifiers on the frame.

Referring to the drawings, I represents a plot of soil or ground which is suitable for a source of material for the soil to be treated. In this case the upper or top portion of the soil as indicated at 2 above the line 3 is scarified or otherwise worked on for a depth of about five or six inches, more or less, to divide the same into a loose or more or less finely divided mass, and in this, preferably during the scarifying, a quantity of water and a measured quantity of oil are incorporated or spaced in the soil entirely under the surface. A portion of the treated or stabilized soil is to be employed for the floors or foundation and the balance for walls, roof, etc. The soil for other than the floors, walks, streets, gutters, etc., which has been treated or moisture proofed may then be removed or lifted and stock piled as indicated in Fig. 4 to be thereafter placed in suitable forms for the construction of the walls, roofs, etc.

Before setting up forms and proceeding to the erection of the walls, etc., the scarified oil and water treated soil bed is preferably harrowed, raked or otherwise leveled off, and then that portion which is to constitute the floor is condensed or compacted by rolling or the like so as to provide a firm and hard floor. After the floors and foundation are stabilized, a skeleton frame is erected to accommodate form boards and preferably the skeleton frame is left in place, forming a reinforcement and stiffening of the walls.

Referring to Figs. 5 and 6, 4 represents the floor which has been compacted; arranged on the floor are suitable sills 6—6 preferably spaced apart, upon which are mounted spaced studding 5—5, the studding being ordinarily two-by-fours spaced transversely and lengthwise the proposed wall. At the upper ends of the two-by-fours or equivalents are arranged the header plates 7—7 which carry the roof body. The studding 5—5 are transversely spaced apart a distance to give the desired thickness of wall which ordinarily would be twelve to twenty inches or whatever may be found desirable. Arranged at the outside of each line of studding are form boards 8 which are maintained in place by the outside clamping form members 9'—9' secured together by a suitable number of ties, bolts or the like 10 commonly used in form construction or braced. Ordinarily, it is preferred to secure a reinforcing wire such as what is known as chicken wire at the inner and outer sides under the form boards, tacked to studding. I have illustrated such reinforcement 9 at the outside of the form or studding between the studding 5 and the form boards 8. This if desired may also be arranged at the inner sides or faces of the rows of studding as indicated at the left hand side of Fig. 6, which shows the same also at the outsides of the rows. This wire for plaster reinforcement may be tacked, stapled or nailed to the studding and while not ordinarily essential, nevertheless may in instances be found desirable.

After the forms have been erected as described or in an equivalent manner, material 2 is taken from the stock pile and placed in the forms. Usually I prefer to place a certain amount of material in the form and then tamp or compact the same, and continue this procedure up to the top of the wall. I also generally prefer, as the wall is being constructed, to sprinkle a thin layer of Portland cement 11 at intervals, stratifying the wall. This layer of dry cement may be a thin layer, for example, an eighth or quarter inch thick more or less, and in some instances I mix the same with a proportion of sand. I have found that the cement or cement and sand tends to speed up the drying of the wall and it also undoubtedly adds some strength.

After the wall has more or less dried out or set and is fully self-sustaining, the form boards 8 and members 9' may then be removed, the ends of the tie members 10 being cut off so that they do not project beyond the face of the wall either at the inside or outside. The studding 5—5 are left imbedded in the wall, adding strength thereto and also forming a base on the inside or outside in case it is desired to attach anything to the walls.

After the form boards have been removed, the outside walls may be stuccoed or plastered and the inside walls may also be plastered and smoothed off if desired. It is needless to say that the desired number of door and window frames may be located in the wall during the construction of the same, and it is believed that this is so obvious I have not illustrated such frames.

After the construction of the walls, the roof is put on and this is constructed by arranging suitable boards or the like and resting upon the bars at the upper ends of the two-by-fours. The roof may be flat or may be slightly sloping forming a truss. Over the roofing boards 22, I arrange one or more plies 23 of tar paper or the like, and over this I spread a coating of the aggregate taken from the stock pile 2. If desired, a reinforcement 21 may be laid in the aggregate so as to be imbedded therein, but generally speaking the same is not necessary. After the roof has been laid or the aggregate placed on the same, it is then compacted, condensed or rolled the same as the floor so that the compacting on the upper surface of the roof causes the water in the material when rising to carry the oil vertically upward through the mass and thus gradually fill the voids in the mass and seal the upper surface of the same to provide a water-proof covering. I prefer to extend the roof some distance outwardly from the wall at its edges so that the extending roof at the outside will, to a certain extent, counterbalances the roof at the inner side of the wall so that trusses and interior supports for the roof are negligible or not required. Obviously, there may be many variations in the roof construction insofar as reinforcement or auxiliary support to the synthetic asphalt roof. I also generally prefer to make the central portion of the roof thinner and the periphery thicker than the central portion, thus facilitating the counterbalancing of the weight of the roof on the top of the walls.

If the ceiling is to be flat, drainage is accomplished by grading asphalt roof cover.

The building when completed is moisture, fire and termite-proof and forms efficient insulation against cold at the outside or loss of heat from the inside. Window and door openings may of course be located where desired. The same may be finished as previously described with stucco or plaster or white wash or painted so that it may be very attractive in appearance.

From the foregoing description, it is believed obvious that the building may be very inexpensively constructed both as to materials and labor, and that unskilled labor can erect the same without difficulty and at a minimum of time.

I have illustrated in Figs. 9 to 15 my preferred apparatus for preparing the soil and treating the same with the oil and water or with other materials suitable for the purpose. While any suitable apparatus may be employed for the purpose, that shown is simple, inexpensive and very efficient.

Referring particularly to Figs. 9 and 10, the numeral 26 generally represents a suitable frame provided with a hitch draw bar 24 for attaching the same to a truck, tractor or like traction device, the same being provided at its rear end with supporting or connecting wheels 27. I prefer to use the caster wheels arranged in the forks 28 which are suitably pivotally and vertically adjustably secured to the frame 26 by bracket members 29.

Arranged on the frame are one or more tanks or drums 30 and 31 which are supported on a suitable rack, these drums being designed to carry water-proof oil, crude oil, water or the like. They may be directly connected together by suitable piping so that they may both be used for the same liquid should that be desired. As shown, however, they are connected through the measuring devices.

Arranged on the frame are two measuring valve casings 32, one for each tank or drum 30—31. As shown in these figures, pipes 34 connect with the casings 32, which casings are also connected together by suitable piping 38. Within each casing 32 is a metering or measuring valve 36 which will measure or meter the material discharged from the tanks into the valve casings 32 and through the discharge pipe 37. The discharge pipe 37 connects with a pipe 38 connecting the two casings 32 and with a pipe 39 arranged to discharge into a manifold 40. The two valves 36 are rotated in their respective casings 32 by means of a driving shaft 42 arranged to be driven in any suitable manner as illustrated from a ground wheel 47 which is rotated as the apparatus is drawn over the ground. As shown in Fig. 10, a sprocket wheel 44 on the shaft 42 is driven by sprocket chain 43 which passes over and is driven by the sprocket 45 secured to the shaft 46 upon which the ground wheel 47 is secured. Ground wheel 48 is provided with pins, lugs or the equivalent 48 which will engage in the ground so that the ground wheel will be positively turned as the apparatus moves. As shown, the wheel shaft 46 is mounted on an adjustable movable arm 49 pivotally secured to the frame at 50 so that it may be vertically adjusted as required.

The frame 26 carries a plurality of scarifying members 53 (see Figs. 10 and 11) which are pivotally secured at 54 to the cross frame members 26, there being a plurality of members 26 extending across the machine and carrying the scarifying members. These members are preferably yieldingly maintained in operative position by the springs 54 secured to cross members on the frame and to pins, lugs or the like 55 at the upper end of the scarifier. It will be noted by referring to Fig. 11 that the forward movement of the scarifier 53 is limited by the flange 26'. The purpose of the spring is to normally maintain the members 53 in operative position, but in the event that the shoe or shovel 56 at the bottom of a scarifier engages a boulder or tree root it may yield and move backward without injury to the apparatus.

The various scarifying members 53 are preferably arranged more or less as shown in Fig. 9 and diagrammatically in Fig. 15 so that they thoroughly cover the space to be treated. The several scarifying members 53 are each provided with the shovels or plows 56 at the lower end and these are preferably shaped or formed as shown in Figs. 13 and 14. It will be noted by referring to Fig. 13 that in the preferred construction as the members 53 are drawn or pulled forward, the shape of the shovels or plows at the bottom have a tendency to slightly raise the soil as indicated at 57 (Fig. 13). Each member 53 carries a discharge pipe 59 terminating in a nozzle or lower end 60, the member 60 being preferably adjustable on the pipe 59 but maintained in the desired position by thumb nuts, set screws or the like 61. Each discharge pipe 59 is connected by means of a flexible conduit 62 to the manifold 40.

The operation of the apparatus is substantially as follows: Oil, such as crude oil or other waterproof oil, is placed in one of the tanks or drums and water in the other, it being understood that in some instances where the soil is sufficiently moist it may be that only oil would be used. As the machine moves along the ground, assuming that the valves 35 are open and the machine has been moved sufficiently to drag the plows, shovels or shoes under the soil to the desired extent, movement of the machine turns the ground wheel 47 operating the valves 36 in the casings 32 and permitting the flow of oil or water from the metering casings, through the pipes 37 into the pipe 38, and thence through pipe 39 to the manifold 40, from whence it flows through the various conduits 32 to the pipes 39 and discharge nozzle 60 on the scarifiers so that as the machine is drawn along, the liquids are deposited adjacent the surface of the ground to the desired depth and in the desired quantities and relative proportions between the oil and water.

I have found that a machine constructed in accordance with the foregoing uniformly discharges the oil and water into the soil, at the same time thoroughly breaking up the soil. The soil as thus prepared is suitable for preparing the stock pile material for the construction of the house, walls and roof previously described and for the floors, walks and roads.

Having thus described my invention, it is obvious that various immaterial modifications may be made in the same and the method of using the synthetic asphalt aggregate; hence, I do not wish to be understood as limiting myself to the exact details and steps herein set forth.

What I claim as new and desire to secure by Letters Patent is:

1. The herein described method of constructing a building comprising dividing soil while the same is in situ to reduce the same to a loose more or less finely divided mass, simultaneously incorporating measured quantities of water in the mass in a quantity to constitute an upwardly moving hydrostatic head when down pressure is applied adjacent the upper surface of the mass, and simultaneously incorporating controlled portions of oil in the mass adjacent the upper surface thereof during the incorporation of the water therein, then applying a compacting pressure to the mass from the upper surface thereof to cause the water when rising to carry the oil vertically upward through the mass and thus gradually fill the voids in the mass to seal the upper surface to the mass to provide a floor, and dividing other soil to similarly reduce the same and incorporating water and oil in the same removing said soil, arranging it in forms for wall construction, and compacting the same as the forms are filled.

2. The herein described method of preparing material for wall construction consisting in dividing soil while the same is in situ to reduce the same to a loose more or less finely divided mass, simultaneously incorporating water in the mass in a quantity sufficient to constitute an upwardly moving hydrostatic head when down pressure is thereafter applied at the upper surface of the head, incorporating controlled portions of oil in the mass below the upper surface thereof simultaneously along with the water to cause the water when rising to carry the oil vertically upward through the mass and thus gradually fill the voids in the mass, thence removing the mass from the surface of the ground and stock piling the same for wall construction.

HENRY A. INGALLS.

REFERENCES CITED

The following references are of record in the file of this patent:

UNITED STATES PATENTS

| Number | Name | Date |
| --- | --- | --- |
| Re. 21,262 | Ingalls | Nov. 14, 1939 |
| 416,180 | Neukirch | Dec. 3, 1889 |
| 1,655,676 | Daggett | Jan. 10, 1928 |
| 1,795,655 | MacDonald | Mar. 10, 1931 |
| 2,192,027 | Growder | Feb. 27, 1940 |